United States Patent
Aimone et al.

(10) Patent No.: US 11,642,644 B2
(45) Date of Patent: *May 9, 2023

(54) MICROREACTOR SYSTEMS AND METHODS

(71) Applicants: Paul R. Aimone, Bridgewater, MA (US); Marc Abouaf, Harvard, MA (US); Patrick Hogan, Somerville, MA (US)

(72) Inventors: Paul R. Aimone, Bridgewater, MA (US); Marc Abouaf, Harvard, MA (US); Patrick Hogan, Somerville, MA (US)

(73) Assignee: H.C. Starck Solutions Coldwater, LLC, Coldwater, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/393,497

(22) Filed: Aug. 4, 2021

(65) Prior Publication Data

US 2022/0023821 A1 Jan. 27, 2022

Related U.S. Application Data

(60) Continuation of application No. 16/682,072, filed on Nov. 13, 2019, now Pat. No. 11,110,426, which is a (Continued)

(51) Int. Cl.
*B01J 19/00* (2006.01)
*B01J 19/02* (2006.01)
(Continued)

(52) U.S. Cl.
CPC ............ *B01J 19/0093* (2013.01); *B01J 19/02* (2013.01); *B01J 19/2415* (2013.01); *B22F 5/10* (2013.01); *B22F 10/38* (2021.01); *B22F 10/43* (2021.01); *B01J 2219/00092* (2013.01); *B01J 2219/00822* (2013.01); *B01J 2219/00837* (2013.01); *B01J 2219/00873* (2013.01);
(Continued)

(58) Field of Classification Search
CPC .... B01J 19/0093; B01J 19/2415; B01J 19/02; B01J 2219/00092; B01J 2219/0236; B01J 2219/0277; B01J 2219/00873; B01J 2219/00837; B01J 2219/00822; B22F 5/10; B22F 3/1055; B22F 3/008; B22F 3/12; Y02P 10/25; B33Y 10/00; B33Y 80/00; B33Y 30/00; B23P 17/00
USPC .................................................. 422/603, 198
See application file for complete search history.

(56) References Cited

U.S. PATENT DOCUMENTS 3,127,860 A 4/1964 Wenger
3,853,309 A 12/1974 Widmer
(Continued)

OTHER PUBLICATIONS

International Search Report and Written Opinion issued in corresponding International Application No. PCT/US2015/059856 dated Feb. 23, 2016.

*Primary Examiner* — Huy Tram Nguyen
(74) *Attorney, Agent, or Firm* — Morgan, Lewis & Bockius LLP

(57) ABSTRACT

In various embodiments, a microreactor features a corrosion-resistant microchannel network encased within a thermally conductive matrix material that may define therewithin one or more hollow heat-exchange conduits.

20 Claims, 3 Drawing Sheets

Related U.S. Application Data continuation of application No. 16/137,690, filed on Sep. 21, 2018, now Pat. No. 10,507,449, which is a division of application No. 14/936,916, filed on Nov. 10, 2015, now Pat. No. 10,105,671.

(60) Provisional application No. 62/078,053, filed on Nov. 11, 2014.

(51) Int. Cl.

| | | |
|---|---|---|
| *B01J 19/24* | (2006.01) | |
| *B22F 5/10* | (2006.01) | |
| *B22F 10/38* | (2021.01) | |
| *B22F 10/43* | (2021.01) | |
| *B33Y 10/00* | (2015.01) | |
| *B33Y 80/00* | (2015.01) | |
| *B22F 3/12* | (2006.01) | |
| *B22F 10/14* | (2021.01) | |
| *B22F 10/25* | (2021.01) | |
| *B22F 10/28* | (2021.01) | |

(52) U.S. Cl.
CPC ...... *B01J 2219/0236* (2013.01); *B01J 2219/0277* (2013.01); *B22F 3/12* (2013.01); *B22F 10/14* (2021.01); *B22F 10/25* (2021.01); *B22F 10/28* (2021.01); *B33Y 10/00* (2014.12); *B33Y 80/00* (2014.12); *Y02P 10/25* (2015.11)

(56) References Cited

U.S. PATENT DOCUMENTS

| | | |
|---|---|---|
| 4,378,626 A | 4/1983 | Eitel |
| 5,811,062 A | 9/1998 | Wegeng et al. |
| 6,257,310 B1 | 7/2001 | Janko |
| 6,415,860 B1 | 7/2002 | Kelly et al. |
| 6,645,432 B1 | 11/2003 | Anderson et al. |
| 6,668,912 B2 | 12/2003 | Adams et al. |
| 6,892,802 B2 | 5/2005 | Kelly et al. |
| 7,323,143 B2 | 1/2008 | Anderson et al. |
| 7,673,389 B2 | 3/2010 | Lehman et al. |
| 7,857,874 B2 | 12/2010 | Kihara et al. |
| 8,066,955 B2 | 11/2011 | Pinchot |
| 10,105,671 B2 * | 10/2018 | Aimone ............... B01J 19/2415 |
| 10,507,449 B2 | 12/2019 | Aimone et al. |
| 2002/0100714 A1 | 8/2002 | Staats |
| 2003/0173720 A1 * | 9/2003 | Musso ................ H01L 21/4871 |
| | | 257/E23.099 |
| 2005/0133187 A1 | 6/2005 | Seaver et al. |
| 2009/0034362 A1 | 2/2009 | Mae et al. |
| 2009/0087359 A1 | 4/2009 | Roberge et al. |
| 2011/0135543 A1 | 6/2011 | Tatarchuk et al. |
| 2012/0292003 A1 | 11/2012 | Lehman |
| 2014/0322105 A1 | 10/2014 | Roberge et al. |
| 2015/0267966 A1 | 9/2015 | Lin et al. |
| 2016/0129417 A1 | 5/2016 | Aimone et al. |
| 2019/0022620 A1 | 1/2019 | Aimone et al. |
| 2020/0147579 A1 | 5/2020 | Aimone et al. |

\* cited by examiner

MICROREACTOR SYSTEMS AND METHODS

RELATED APPLICATIONS

This application is a continuation of U.S. patent application Ser. No. 16/682,072, filed Nov. 13, 2019, which is a continuation of U.S. patent application Ser. No. 16/137,690, filed Sep. 21, 2018, which is a division of U.S. patent application Ser. No. 14/936,916, filed Nov. 10, 2015, which claims the benefit of and priority to U.S. Provisional Patent Application No. 62/078,053, filed Nov. 11, 2014, the entire disclosure of each of which is hereby incorporated herein by reference.

This application claims the benefit of and priority to U.S. Provisional Patent Application No. 62/078,053, filed Nov. 11, 2014, the entire disclosure of which is hereby incorporated herein by reference.

TECHNICAL FIELD

In various embodiments, the present invention relates to the fabrication and use of microreactors.

BACKGROUND

Microreactors are devices utilized to manipulate and/or react chemical reagents in small-scale, controllable volumes. Because such reagents (and/or their reaction products) are often caustic and/or corrosive, microreactors frequently feature networks of microchannels etched out of plates of corrosion-resistant material, for example as described in International Patent Application Publication No. WO2007/112945, the entire disclosure of which is incorporated by reference herein. While such systems frequently do include entire separate modules (e.g., separate plates) for conducting heat away from the reaction channels, the use of entire plates of the corrosion-resistant material (1) can be quite expensive, and (2) deleteriously impacts the efficiency of heat exchange, as the heat produced by the reactions in the microreactor must be conducted not only through the channels themselves but also through the remaining thickness of the plate and through the interface between the reaction module and the heat-exchange module before reaching a heat-exchange module. Thus, there is a need for microreactor designs that minimize the use of expensive, non-thermally-conductive corrosion-resistant materials in order to improve the conduction of heat out of the microreactor.

SUMMARY

In accordance with various embodiments of the present invention, hollow corrosion-resistant microchannels (or "microchannel conduits") of a microreactor are formed from a corrosion-resistant material, and the network of microchannels is subsequently or concurrently surrounded (or "encased") by a different, "matrix" material having a higher thermal conductivity. Thus, the use of the corrosion-resistant metal is minimized, reducing materials expense and improving thermal conductivity from the microchannel conduits, and additionally allowing for the use of designs not possible by conventional manufacturing methods. In various embodiments, the corrosion-resistant material includes, consists essentially of, or consists of one or more refractory metals (e.g., niobium (Nb), molybdenum (Mo), tantalum (Ta), tungsten (W), and/or rhenium (Re)), titanium (Ti), zirconium (Zr), hastelloy (i.e., a nickel-based alloy that may also contain additions of cobalt, chromium, Mo, W, iron, silicon, manganese, and/or carbon, with the balance nickel), glass, and/or stainless steel. The corrosion-resistant material may have a relatively high melting point and/or hardness, relatively low ductility, and/or a relatively low thermal conductivity. In various embodiments, the matrix material includes, consists essentially of, or consists of one or more metals having relatively high thermal conductivity such as aluminum (Al), gold (Au), brass, silver (Ag), and/or copper (Cu). While the matrix material may form a solid construct surrounding the corrosion-resistant microchannels, in some embodiments the matrix material defines hollow heat-exchange channels through which a heat-exchange fluid (e.g., water) may flow to conduct heat away from regions proximate the corrosion-resistant microchannels.

As used herein, the term "microreactor" means a fluidic device containing one or more microchannels having a diameter (or other lateral dimension) of approximately 1 cm or smaller, or even approximately 1 mm or smaller. Such microchannels typically enable higher heat-transfer and mass-transfer rates compared to larger-scale devices. The microchannels may be utilized to contain a moving or static fluid for, e.g., heat exchange, processing, and/or reaction with one or more other fluids (that may each also be contained within a microchannel). Thus, the "microreactor" may include or consist essentially of a "microchannel heat exchanger" and/or a "microchannel reactor," as those terms are utilized in the art. One or more microchannels may contain a heat-transfer medium (e.g., a heat-transfer fluid such as water) for heat exchange with one or more of the other fluids confined within the microreactor.

In various embodiments of the invention, the corrosion-resistant microchannels are fabricated via, for example, additive manufacturing techniques such as three-dimensional printing, or even bending and welding. In some embodiments, various corrosion-resistant microchannels may be formed by one technique (e.g., thermomechanical processing), various more complicated parts of the microchannel network may be formed by another technique (e.g., additive manufacturing techniques such as three-dimensional printing), and these parts may be joined together to form the finished microchannel network that is subsequently encased in the thermally conductive matrix material. As utilized herein, the term "additive manufacturing technique" refers to a fabrication technique in which a three-dimensional part is fabricated in layer-by-layer fashion via deposition and consolidation of material from powder or wire feedstock, followed by optional sintering/densification at elevated temperature. As utilized herein, the term "thermomechanical processing technique" refers to a fabrication technique in which metal feedstock (e.g., ingot, sheet, etc.) is both deformed and heat-treated (simultaneously and/or serially) to form a part with a desired shape and mechanical properties. As utilized herein, the term "powder metallurgy technique" refers to a fabrication technique in which powder is compacted in bulk and sintered (simultaneously and/or serially) in order to form a solid three-dimensional object.

In an aspect, embodiments of the invention feature a microreactor that includes or consists essentially of a network of hollow microchannel conduits and a matrix surrounding and in contact with the microchannel conduits. The microchannel conduits include, consist essentially of, or consist of a corrosion-resistant material. The matrix includes, consists essentially of, or consists of a matrix material having a thermal conductivity larger than a thermal conductivity of the corrosion-resistant material. One or more hollow heat-exchange channels may be defined by and disposed within the matrix material. Each heat-exchange channel may be proximate one or more microchannel conduits, e.g., such that a heat-exchange fluid within the heat-exchange channel is in thermal contact with fluid within the one or more microchannel conduits. The heat-exchange channels, if present, do not intersect any of the microchannel conduits.

Embodiments of the invention may include one or more of the following in any of a variety of combinations. The corrosion-resistant material may include, consist essentially of, or consist of niobium, molybdenum, tantalum, tungsten, rhenium, titanium, zirconium, hastelloy, glass, and/or stainless steel. The matrix material may include, consist essentially of, or consist of aluminum, gold, brass, silver, and/or copper. The diameter of at least one heat-exchange channel (or other lateral dimension, for channels having non-circular cross-sections) may be larger than a diameter of at least one microchannel conduit (or other lateral dimension, for microchannel conduits having non-circular cross-sections). A portion of the matrix proximate at least one microchannel conduit may include, consist essentially of, or consist of a mixed and/or graded composition including, consisting essentially of, or consisting of the corrosion-resistant material and the matrix material. The network of microchannel conduits may include or consist essentially of (i) two or more input conduits converging to a single reaction zone, and (ii) an output conduit leading away from the reaction zone.

In another aspect, embodiments of the invention feature a method of fabricating a microreactor. A network of hollow microchannel conduits is formed from a corrosion-resistant material. Thereafter and/or thereduring, the network of microchannel conduits is surrounded with and encased within a matrix material having a thermal conductivity larger than a thermal conductivity of the corrosion-resistant material.

Embodiments of the invention may include one or more of the following in any of a variety of combinations. A plurality of hollow heat-exchange conduits may be defined within the matrix material. The heat-exchange conduits may not intersect the microchannel conduits. The network of microchannel conduits may be formed by an additive manufacturing technique, e.g., three-dimensional printing. The matrix material may be formed around the microchannel conduits via the additive manufacturing technique (e.g., during and/or after the formation of the network of microchannel conduits). The matrix material may be disposed around the microchannel conduits by a powder metallurgy technique, e.g., powder pressing. The matrix material may be disposed around the microchannel conduits by casting. The corrosion-resistant material may include, consist essentially of, or consist of niobium, molybdenum, tantalum, tungsten, rhenium, titanium, zirconium, hastelloy, glass, and/or stainless steel. The matrix material may include, consist essentially of, or consist of aluminum, gold, brass, silver, and/or copper.

In yet another aspect, embodiments of the invention feature a method of fabricating a microreactor. Metal sheet is shaped and/or joined to form one or more hollow tubular microchannel conduits. The metal sheet includes, consists essentially of, or consists of a corrosion-resistant material. One or more microreactor parts each configured to interface with one or more of the microchannel conduits are fabricated via an additive manufacturing technique utilizing a feedstock (e.g., wire and/or powder) that includes, consists essentially of, or consists of the corrosion-resistant material. The one or more microchannel conduits are joined to the one or more microreactor parts, thereby forming a microchannel network of the microreactor. Thereafter, the microchannel network is encased within a matrix material having a thermal conductivity larger than a thermal conductivity of the corrosion-resistant material. During or after the encasing of the microchannel network within the matrix material, one or more hollow heat-exchange conduits may be defined within the matrix material. The one or more heat-exchange conduits, if present, do not intersect the microchannel network.

Embodiments of the invention may include one or more of the following in any of a variety of combinations. The microchannel network may be encased within the matrix material via an additive manufacturing technique, e.g., three-dimensional printing. The microchannel network may be encased within the matrix material via casting. The microchannel network may be encased within the matrix material via a powder metallurgy technique, e.g., powder pressing. The corrosion-resistant material may include, consist essentially of, or consist of niobium, molybdenum, tantalum, tungsten, rhenium, glass, titanium, zirconium, hastelloy, and/or stainless steel. The matrix material may include, consist essentially of, or consist of aluminum, gold, brass, silver, and/or copper.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
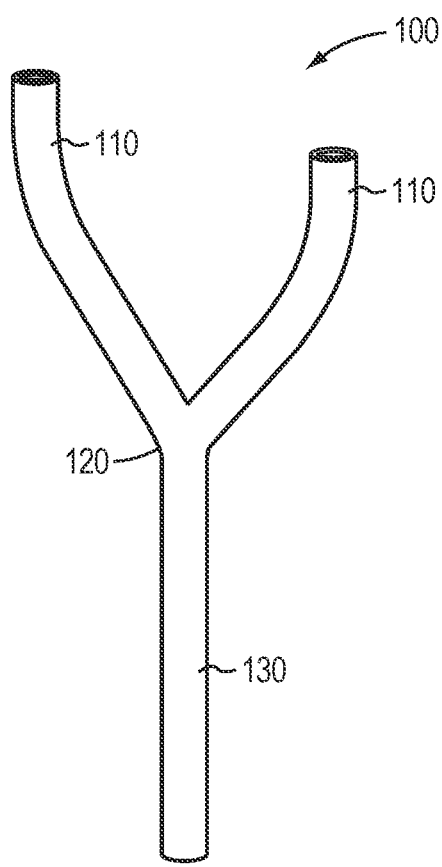
FIG. 1 is a schematic representation of a simplified network of microchannels in accordance with various embodiments of the invention.

FIG. 1 depicts an example of a simplified network or partial network 100 of corrosion-resistant microchannels, which may be a portion of a larger network of microchannels within a microreactor. In the depicted example, the microchannel network 100 features two input channels 110 through which chemical reagents may be introduced for combination and reaction at a reaction zone 120, and an output channel 130 through which the reaction product (and/or portions of the initial reagents) is conducted. The diameter (or other lateral dimension, in embodiments featuring channels having non-circular cross-sections) of the channels may be less than approximately 1 cm, or even less than approximately 1 mm. The wall thickness of the microchannels may be, for example, between 10 μm and 500 μm. In various embodiments of the invention, the microreactor lacks reaction zones 120, and fluids are confined and/or conducted within microchannels and/or exchange heat with fluids confined and/or conducted within nearby microchannels.

Figure 2:
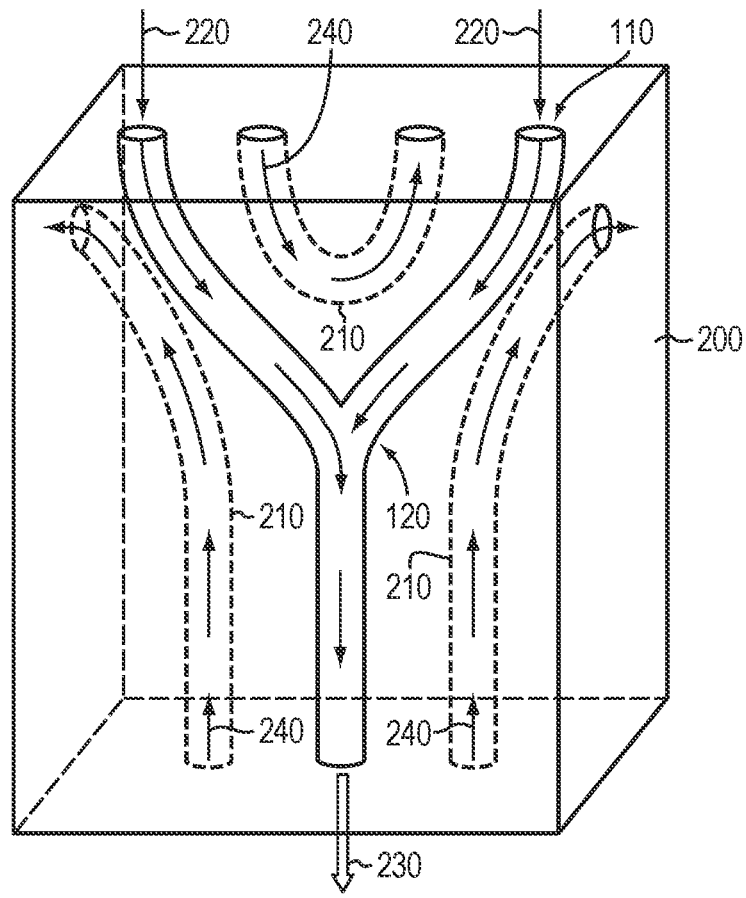
FIG. 2 is a schematic representation of a microreactor featuring the microchannel network of FIG. 1 encased within a thermally conductive matrix material in accordance with various embodiments of the invention.

Once the network 100 of microchannels is fabricated, or substantially simultaneously with the fabrication of the network 100, a matrix material 200 may be formed around and in physical contact with the microchannels, as shown in FIG. 2. As shown, the matrix material 200 thus forms a surrounding "block" or "matrix" around the network of microchannels 100, and this close proximity to the microchannels enables efficient transfer of heat from the microchannels that have lower thermal conductivity. As also shown in phantom, one or more heat-exchange channels 210 may be formed within the matrix 200, enabling the introduction of a heat-transfer fluid to further expedite transfer of the heat of reaction from the microchannels 100. As depicted in FIG. 2, one or more input fluids 220 may be introduced into the input channels 110 and react in the reaction zone 120, and an output fluid (or "output product") 230 flows out of output channel 130. As also shown, a heat-exchange fluid 240 may flow or be contained within the heat-exchange channels 210 to exchange heat with the input fluids 220 and/or output fluid 230, and/or to conduct away heat of reaction from the reaction zone 120.

In various embodiments of the invention, the network of microchannels 100 is formed of a corrosion-resistant material that includes, consists essentially of, or consists of one or more refractory metals (e.g., Nb, Mo, Ta, W, and/or Re), glass, and/or stainless steel. The corrosion-resistant material may have a relatively high melting point and/or hardness, relatively low ductility, and/or a relatively low thermal conductivity. For example, the corrosion-resistant material may have a melting point of, e.g., between approximately 1300° C. and approximately 3500° C., or even between approximately 2000° C. and approximately 3500° C. The corrosion-resistant material may have a thermal conductivity of less than 200 watts per meter per Kelvin ($W \cdot m^{-1} \cdot K^{-1}$), less than 160 $W \cdot m^{-1} \cdot K^{-1}$, less than 150 $W \cdot m^{-1} \cdot K^{-1}$, less than 100 $W \cdot m^{-1} \cdot K^{-1}$, less than 75 $W \cdot m^{-1} \cdot K^{-1}$, less than 60 $W \cdot m^{-1} \cdot K^{-1}$, or even less than 50 $W \cdot m^{-1} \cdot K^{-1}$. The corrosion-resistant material may have a thermal conductivity of at least approximately 0.5 $W \cdot m^{-1} \cdot K^{-1}$, or at least approximately 1 $W \cdot m^{-1} \cdot K^{-1}$.

In various embodiments, the matrix material 200 includes, consists essentially of, or consists of one or more metals having relatively high thermal conductivity such as Al, Au, brass, Ag, and/or Cu. The matrix material 200 may have a thermal conductivity of at least 100 $W \cdot m^{-1} \cdot K^{-1}$, at least 170 $W \cdot m^{-1} \cdot K^{-1}$, or even at least 300 $W \cdot m^{-1} \cdot K^{-1}$. The matrix material 200 may have a thermal conductivity less than 500 $W \cdot m^{-1} \cdot K^{-1}$, or even less than 400 $W \cdot m^{-1} \cdot K^{-1}$. While the matrix material 200 may form a solid construct surrounding the corrosion-resistant microchannels 100, in some embodiments (and as shown in FIG. 2), the matrix material 200 defines hollow heat-exchange channels 210 through which heat-exchange fluid may flow to conduct heat away from regions proximate the corrosion-resistant microchannels 100.

The matrix material 200 may be formed around the network of microchannels 100 by, for example, casting or powder pressing and sintering, thereby producing a monolithic structure encasing the corrosion-resistant network of microchannels 100 while minimizing the necessary amount of the corrosion-resistant material. In various embodiments, after the microchannels 100 are formed or during their formation, the open (during deployment) ends of the microchannels may be sealed or otherwise blocked in order to prevent entry of the matrix material 200 therein. For example, the ends of the microchannels 100 may be sealed during an additive manufacturing process or may be sealed after fabrication with a mass of the corrosion-resistant material. In various embodiments, the sealed microchannels 100 are subsequently fixtured in place in a mold or die, and then the matrix material 200 is cast or pressed around them. The final component may then be machined out of the resulting block of matrix material, and the sealed ends of the microchannels 100 may be removed (e.g., by cutting). In embodiments in which the matrix material 200 is formed by a powder metallurgy technique, the pressed powder may be sintered during or after pressing, and then the sealed ends of the microchannels 100 may be removed.

In embodiments in which the matrix material 200 is formed around the microchannels 100 via a powder metallurgy technique, the powder pressing and/or sintering conditions may be selected based on the specific matrix material 200. For example, for a matrix material 200 including, consisting essentially of, or consisting of copper, the copper-based powder may be compacted utilizing a pressure of, e.g., between 200 and 300 MPa. The pressed copper-based powder may be sintered at a temperature of, e.g., between approximately 750° C. and approximately 1000° C., for a time of, e.g., between approximately 50 minutes and approximately 1000 minutes. In another example, for a matrix material 200 including, consisting essentially of, or consisting of aluminum, the aluminum-based powder may be compacted utilizing a pressure of, e.g., between 80 and 400 MPa. The pressed aluminum-based powder may be sintered at a temperature of, e.g., between approximately 550° C. and approximately 620° C., for a time of, e.g., between approximately 50 minutes and approximately 200 minutes. The sintering of matrix material 200 may be performed in a vacuum ambient or in an ambient that includes, consists essentially of, or consists of, e.g., nitrogen, hydrogen, or ammonia.

In embodiments in which the matrix material 200 is formed around the microchannels 100 via casting, the casting temperature may be, e.g., between approximately 50° C. and approximately 200° C. above the melting point of the matrix material 200. For example, for a matrix material 200 including, consisting essentially of, or consisting of copper, the casting temperature may be between approximately 1150° C. and approximately 1180° C. In various embodiments, the casting temperature is less than the melting or softening temperature of the corrosion-resistant material, in order to prevent damage to or deformation of the network of microchannels 100. Thus, in embodiments in which the matrix material 200 is formed by casting, the matrix material 200 typically has a melting temperature at least 200° C., at least 500° C., at least 1000° C., or even at least 2000° C. less than that of the corrosion-resistant material.

The heat-exchange channels 210 may be formed during the casting or pressing and sintering, or they may be machined out of the matrix material 200 after it has been formed around the corrosion-resistant microchannels 100. The heat-exchange channels 210 may have diameters (or other lateral dimensions) comparable to those of the microchannels 100 (e.g., less than approximately 1 cm, or even less than approximately 1 mm), or they may have larger diameters, enabling larger amounts of the heat-exchange medium to be introduced therein. The heat-exchange channels may be formed by, e.g., any of the techniques described below with respect to FIG. 3.

In other embodiments, the corrosion-resistant microchannels 100 and the thermally conductive surrounding matrix 200 are formed substantially simultaneously by additive manufacturing techniques such as three-dimensional printing. The entire construct (for example, the construct depicted in FIG. 2) may be fabricated layer-by-layer out of the corrosion-resistant material and the matrix material, with the corrosion-resistant material forming the microchannels 100. In such embodiments, the regions immediately surrounding the microchannels 100 may even be fabricated from a mixed or graded composition of the corrosion-resistant material and the matrix material, thereby harnessing the beneficial properties of both materials. For example, a mixed or graded region may surround all or a portion of one or more of the microchannels 100 to moderate any deleterious effects of differential thermal expansion of the corrosion-resistant material relative to the matrix material. (In various embodiments, the coefficients of thermal expansion, e.g., the coefficients of linear expansion, of the corrosion-resistant material and the matrix material may differ by a factor of two or more, a factor of five or more, or even a factor of ten or more; the coefficients may differ by less than a factor of 100, or even less than a factor of 50.) This mixed or graded region may be, e.g., step graded or substantially linearly graded, or may be a substantially uniform mixture of the two materials, and it may have a thickness extending from a microchannel into the matrix that is sufficient to prevent damage such as cracking or delamination between the microchannel and portions of the surrounding matrix; such thicknesses may be straightforwardly determined by one of skill in the art based on the specific geometries of the microchannel and materials of the microchannels and matrix. In various embodiments, the mixed or graded region extends outwardly from at least a portion of at least one of the microchannels by a distance approximately equal to or less the diameter (or other lateral dimension) of the microchannel. In various embodiments, the thickness of the mixed or graded region is approximately 1 cm or less, or even 1 mm or less, and may be at least 0.05 mm.

In an exemplary embodiment, a printing head is utilized to disperse a liquid binder or adhesive (typically a polymer material) into a powder bed of particles of the corrosion-resistant material and/or the matrix material layer-by-layer in approximately the desired shape and size for the microreactor or portions thereof. After each layer, the binder may be cured by, e.g., application of heat or light. After the printing is complete, the microreactor is composed of the particles held together by the binder material. The microreactor may then be sintered to fuse the particles together and melt away some or all of the binder material and possibly leave empty pores (if desired; such pores may subsequently be infiltrated with another material). The sintering may be performed at low pressure (e.g., at least partial vacuum) or in a reducing (e.g., hydrogen or hydrogen-containing) atmosphere. The sintering process may also result in densification of the particles and shrinkage of the microreactor.

Figure 3:
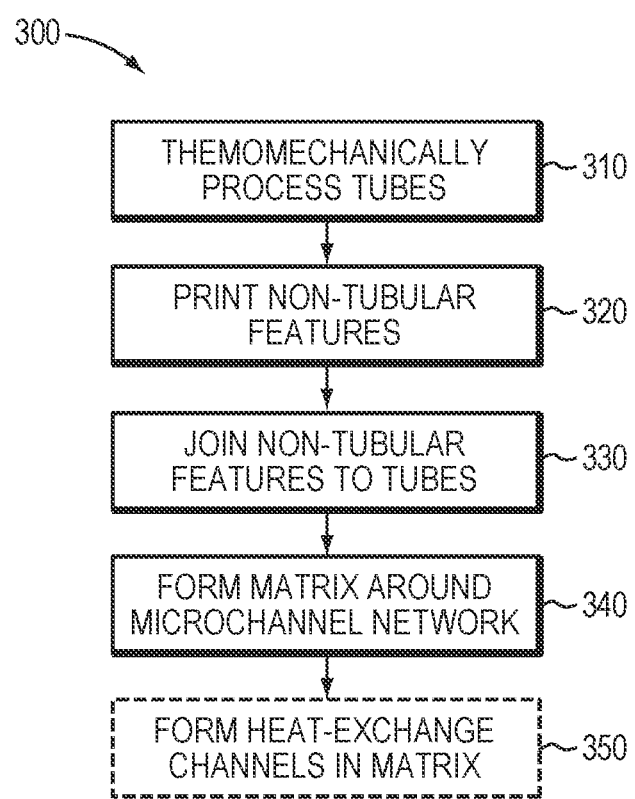
FIG. 3 is a flowchart of a method of fabricating microreactors in accordance with various embodiments of the invention.

FIG. 3 is a flowchart summarizing a method 300 for fabricating microreactors in accordance with embodiments of the present invention. As shown, method 300 may combine various different processing and fabrication techniques together. In step 310, the microchannel network, or portions thereof, is fabricated utilizing thermomechanical processes for the fabrication of small-diameter tubes. Such thermomechanical processes may include, for example, the production of thin sheet of the corrosion-resistant material by, e.g., conventional rolling and annealing processes, followed by slitting, shaping, and welding (or other fastening process) of the sheet into one or more tubes of the desired microchannel diameter. Alternatively, the corrosion-resistant sheet may be rolled to a thicker thickness than desired in the final microchannel network, shaped and welded into tube(s) larger than those desired in the final microchannel network, and then drawn and/or extruded into microchannels of the final desired size.

In step 320, non-tubular features such as mixers, connectors, reaction zones, or other non-linear and/or non-tubular features may be fabricated via additive manufacturing techniques such as three-dimensional printing. For example, a printing head may be utilized to disperse a liquid binder or adhesive (typically a polymer material) into a powder bed of particles of the corrosion-resistant material layer-by-layer in approximately the desired shape and size for the non-tubular part. After each layer, the binder may be cured by, e.g., application of heat or light. After the printing is complete, the part may be sintered to fuse the particles together. In addition to or instead of three-dimensional printing, other additive manufacturing techniques may be utilized to fabricate one or more parts of the microchannel network. For example, laser powder forming, in which a laser is used to melt metal powder (or wire feedstock) supplied coaxially to the focus of the laser beam through a deposition head, may also be utilized. In laser powder forming, the platform on which the part is fabricated is moved in raster fashion to fabricate each layer of the part, and then the deposition head is moved up vertically as each layer is completed. In another example, selective laser melting or selective laser sintering, in which metal powder is distributed, layer-by-layer, on a platform and then fused together (i.e., melted or sintered) via focused application of laser energy, may be utilized. In another example, electron beam additive manufacturing, in which an electron beam is utilized to deposit the corrosion-resistant material (via wire feedstock and/or powder), layer by layer, until the part reaches near-net shape and is ready for finish machining.

In step 330, the features fabricated by additive manufacturing in step 320 are joined to the microchannels fabricated in step 310 via, e.g., welding, brazing, interference fitting, etc. to complete the internal structure of the microchannel network of the microreactor.

In step 340, the completed network of microchannels is encased within the matrix material to form the microreactor. The matrix material may be fabricated around the microchannel network via, for example, casting, powder metallurgy techniques, and/or additive manufacturing techniques (e.g., any of the techniques described above with relation to step 320). In various embodiments, the matrix material is formed around the microchannel network via casting techniques such as investment casting, sand-mold casting, shell-mold casting, permanent-mold casting, die-mold casting, etc. For example, the microchannel network may be disposed within the cavity of a mold, and molten matrix material may be poured or flowed into the mold cavity and around the microchannel network. Multiple different matrix materials may be disposed around different portions of the microchannel network, depending on the amount of temperature management desired in localized portions of the microreactor. In other embodiments, the matrix material is formed around the microchannel network via powder metallurgy techniques. For example, the microchannel network may be disposed within a mold, and powdered matrix material may be poured into the mold to encase the microchannel network therewithin. The matrix-material powder may be subsequently consolidated via techniques such as cold isostatic pressing, hot isostatic pressing, and/or sintering. After consolidation, the finished microreactor may be removed from the mold. As with casting techniques, different types or mixtures of matrix material may be disposed around different portions of the microchannel network and subsequently consolidated. Finally, in other embodiments, the matrix material may be fabricated directly on the microchannel network by additive manufacturing, e.g., three-dimensional printing.

In optional step 350, one or more heat-exchange channels are formed within the matrix material. For example, the heat-exchange channels may be machined out of the consolidated matrix material formed in step 340, or they may be defined within the matrix material during step 340. For example, sacrificial channels (or tubes or even rods) having the approximate size and shape of the final heat-exchange channels may be disposed within the matrix material during formation thereof (e.g., in a casting or powder metallurgy mold) and subsequently removed from the matrix material (e.g., by etching) after consolidation thereof. Of course, in embodiments in which the matrix material is formed by additive manufacturing techniques, the heat-exchange channels may simply be material-free voids left within the matrix during fabrication. In embodiments in which the heat-exchange channels are machines out of the matrix material after formation of the matrix, the heat-exchange channels may be machined using, e.g., electrical discharge machining, in which series of rapidly recurring current discharges between an electrode and the matrix material removes matrix material proximate the electrode; the electrode is moved relative to the matrix material in order to define the desired shapes of the heat-exchange channels.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of fabricating a microreactor, the method comprising:

providing a network of hollow microchannel conduits from a corrosion-resistant material;

providing one or more microreactor parts each (i) configured to interface with one or more of the microchannel conduits and (ii) comprising the corrosion-resistant material;

joining the one or more microreactor parts to the network of microchannel conduits; and surrounding the network of microchannel conduits with a matrix material having a thermal conductivity larger than a thermal conductivity of the corrosion-resistant material.

2. The method of claim 1, wherein providing the one or more microreactor parts comprises forming the one of more microreactor parts via an additive manufacturing technique.

3. The method of claim 2, wherein the additive manufacturing technique comprises three-dimensional printing.

4. The method of claim 1, wherein surrounding the network of microchannel conduits with the matrix material comprises forming the matrix material via an additive manufacturing technique.

5. The method of claim 1, wherein surrounding the network of microchannel conduits with the matrix material comprises forming the matrix material via at least one of casting or powder pressing.

6. The method of claim 1, wherein the corrosion-resistant material comprises at least one of niobium, molybdenum, tantalum, tungsten, rhenium, titanium, zirconium, glass, or stainless steel.

7. The method of claim 1, wherein the matrix material comprises at least one of aluminum, gold, brass, silver, or copper.

8. The method of claim 1, wherein a portion of the matrix proximate at least a portion of the microchannel network has a mixed and/or graded composition comprising the corrosion-resistant material and the matrix material.

9. The method of claim 1, wherein at least one opening in at least one of the microchannel conduits or at least one of the microreactor parts is sealed before the network of microchannel conduits is surrounded with the matrix material, and further comprising unsealing the at least one sealed opening after surrounding the network of microchannel conduits with the matrix material.

10. The method of claim 1, further comprising defining within the matrix material one or more hollow heat-exchange conduits, the one or more heat-exchange conduits not intersecting the network of microchannel conduits.

11. The method of claim 1, wherein providing the network of microchannel conduits comprises forming at least one of the microchannel conduits via an additive manufacturing technique.

12. The method of claim 1, wherein providing the network of microchannel conduits comprises forming at least one of the microchannel conduits via a thermomechanical processing technique.

13. The method of claim 1, wherein providing the network of microchannel conduits comprises forming at least one of the microchannel conduits via a powder metallurgy technique.

14. A method of fabricating a microreactor, the method comprising:

providing an assemblage comprising (i) a network of hollow microchannel conduits comprising a corrosion-resistant material, and (ii) surrounding the network of microchannel conduits, a matrix material having a thermal conductivity larger than a thermal conductivity of the corrosion-resistant material, wherein at least one opening in the assemblage is sealed; and thereafter, unsealing the at least one sealed opening.

15. The method of claim 14, wherein the assemblage comprises one or more microreactor parts each configured to interface with one or more of the microchannel conduits.

16. The method of claim 14, wherein providing the assemblage comprises forming the network of microchannel conduits and/or the matrix material via an additive manufacturing technique.

17. The method of claim 14, wherein providing the assemblage comprises forming the network of microchannel conduits and, thereafter, forming the matrix material.

18. The method of claim 14, wherein providing the assemblage comprises forming the network of microchannel conduits and, thereduring, forming the matrix material.

19. The method of claim 18, wherein a portion of the matrix proximate at least a portion of the microchannel network has a mixed and/or graded composition comprising the corrosion-resistant material and the matrix material.

20. The method of claim 18, wherein the assemblage comprises one or more hollow heat-exchange conduits, the one or more heat-exchange conduits not intersecting the microchannels.

\* \* \* \* \*